Aug. 29, 1972      L. MEIJER      3,687,771
APPARATUS FOR APPLYING A FINISH TO CEMENT BLOCKS OR THE LIKE
Filed Sept. 24, 1969
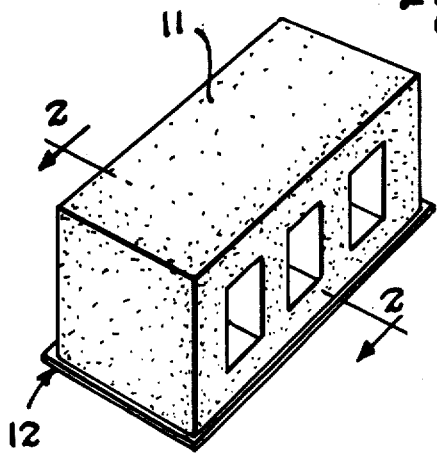
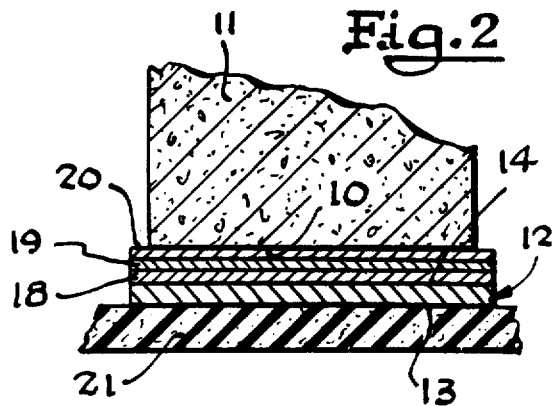
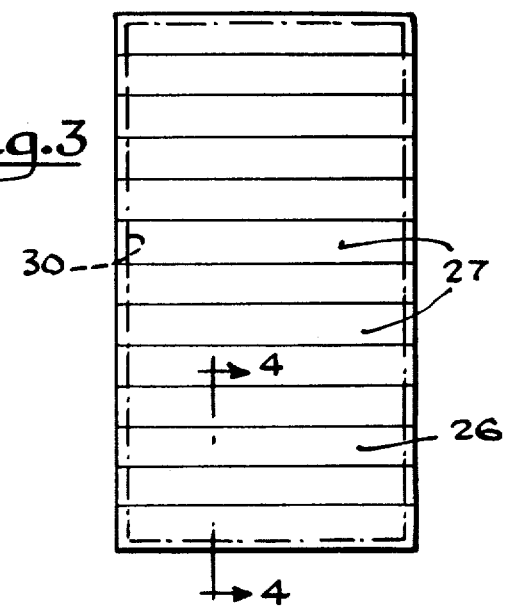
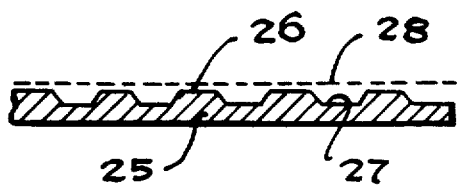
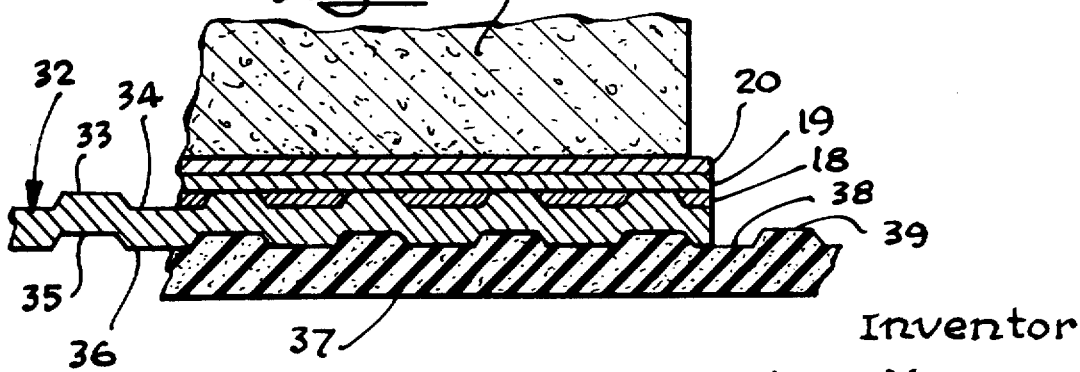
Inventor
LEO MEIJER
By Darbo, Robertson & Vandenburgh
Attorneys

United States Patent Office

3,687,771
Patented Aug. 29, 1972

3,687,771
APPARATUS FOR APPLYING A FINISH TO CEMENT BLOCKS OR THE LIKE
Leo Meijer, 4700 N. Ashland,
Chicago, Ill. 60640
Filed Sept. 24, 1969, Ser. No. 860,534
Int. Cl. B44c 1/10; E04c 1/00, 1/40
U.S. Cl. 156—232
10 Claims

ABSTRACT OF THE DISCLOSURE

After being preheated or by using the retaining heat developed during curing, the concrete block is put on a laminate comprising a plastic or paper base, which has predetermined release characteristics and has been pre-coated respectively with (1) a plastic resin, with or without (2) a decorative plastic layer and finally (3) a heat-reactive layer of plastic adhesive which secures the laminate to the block.

The inner surface of the release plate to which the plastic resin was affixed will permit removal of the release paper, the plastic layers stay on the block-face. The release plate may be left on as a protective cover during shipping and until after the block has been laid up in the wall.

BACKGROUND OF THE INVENTION

For functional and/or aesthetic purposes, wall construction units such as concrete blocks or the like commonly required an added coating on the exposed face. In most instances this is done after the block has been laid up in the wall, requiring scaffolding and the necessary labor for filling and decorating the surface. For various reasons, the practice of prefinishing the exposed face of the block has not been commercially developed on a large scale. Undoubtedly there are various reasons that account for this, among them being: the necessity for using care and/or protecting the prefinished face during transportation to the job-site and during erection; the necessity for the manufacturer to have special automated equipment for applying and drying the paint or other finishes; the necessity for providing a heating and curing cycle for the coatings during which period the finished face must remain undisturbed; the necessity to enlarge production and storage space, and last but not least the time-loss in cleaning and changing equipment from one design to the other. The principal object of the present invention is to provide a method and apparatus for the prefinishing and weather proofing of building units such as concrete blocks and the like, allowing the industry to upgrade its product by supplying a unit which meets present requirements as to functional characteristics, color and design with little change in present operations or added costs for labor and equipment. Further objects and advantages will become apparent from the following description.

SUMMARY OF THE INVENTION

The present invention relates to a method and apparatus for easily and inexpensively applying innumerable forms or protective and/or decorative finishes to a face of a cement block or the like.

DESCRIPTION OF THE DRAWINGS

FIG. 1 is a perspective view of a cement block having a prefinished face being applied thereto in accordance with the teaching of the present invention;

FIG. 2 is an enlarged partial section as viewed at line 2—2 of FIG. 1;

FIG. 3 is a plan view of a paper carrier for producing a design on the face of the block in accordance with the teachings of the present invention;

FIG. 4 is an enlarged partial section as viewed at line 4—4 of FIG. 3; and

FIG. 5 is a sectional view illustrating an alternative form of plate and resilient blanket.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end thereof are intended as the chief aid toward this purpose, as it is these that meet the requirement of pointing out the parts, improvements, or combinations in which the inventive concepts are found.

To apply a prefinish on a face 10 of a concrete unit 11, a plate 12 made of or coated with polyethylene and/or silicone (as a release material) is employed. The release-plate 12 made of plastic, cardboard or paper has a bottom 13 and a top 14 which may or may not be embossed. By employing mechanical means such as extruding, laminating, roller-coating, printing, etc., these plates are converted into carriers of carefully balanced layers of protective coatings, decorative materials or designs, fillers and adhesives. This is done prior to its use in the block plant. As a first step in this process, the release-plate is precoated with a decorative finish applied as a liquid resin, or laminated in sheet form, to the top 14 of the plate 12. In the embodiment illustrated in FIG. 2, this decorative material is placed in two layers, a first layer 18 and a second layer 19. For example, the first layer 18 can be a methacrylic resin, a polyurethane, a polyester or an epoxy resin which is either clear or suitably colored or printed or silkscreened on either side with a design. Alternately it may be a clear resin or a clear film having variously colored decorative material therein, such as colored plastic chips or quartz granules distributed at random or in a prearranged pattern. If the top of the release-plate 14 is embossed the plastic resin or laminate 18 will conform to the configuration of the same.

After the first layer has been deposited on or laminated to the release plate, the second layer 19 is employed, if desired, to give contrasting color to that employed in the design of layer 18, or to create a 3-dimensional effect or light-reflection. In some applications where the design is printed on the surface of the first layer 18, the plastic forming the design may be sprayed with a protective coating, which then must be completely cured so as to prevent any bleeding or interaction of the two plastic resins. Layer 19 is a plastic resin substantially compatible with the one used in layer 18, such as polyvinyl-acetate, acrylic, polyurethane, polyester, etc. In some practices of the invention, the release-plate is only coated with or laminated to one single layer of plastic rather than the two layers 18 and 19. In this instance, the single layer would have the desired coloring material and/or decorative particles of solid plastics, quartz crystals and/or carry a printed or silkscreened design.

Following the application of the decorative layer, or layers 18 and 19, the release-plate is coated with or laminated to a layer of heat-curing adhesive 20 such as a phenol blocked urethane which dries tack-free but can be re-activated by an elevated temperature well below the deforming point of the layers 18 and 19. In some practices of the invention, the plastic adhesive alone is deposited onto the top of the release-plate, without the use of the combination of either layers 18 or 19. In this instance, the film of adhesive 20 would have the desired decorative material or incorporate a printed design.

With the release-plate ready for use, an urethane or styrofoam blanket 21 is employed as a flexible underlayment for this plate. Since the size of the relase-plate 12 and the layers on top 18, 19 and 20 is larger than the face of the block 11, the weight of or pressure on the block 11 in conjunction with the nature of the material used for this blanket 21 will force the edges of the release-plate 12 around the face 10 of the block. For a more automated production, the heretofore described sequence can be reversed by heat-pressing the paper on the block instead of using the weight of the block to press on the paper.

The heat of the block and/or that applied to the paper will liquefy the adhesive 20 and due to the pressure (from the block or otherwise) will force the liquid adhesive into the pores of the face 10 so as to obtain a good mechanical bond.

The block now would be ready for storage or shipment, even though the adhesive and the plastic had not yet cured, since this curing operation could continue during the term of storage or shipment. The plastic selected can be one which will cure at ambient temperature.

The release-plate 12 is coated or made of an adhesion-fobic material, such as polyethylene, polypropylene or silicone, all materials suitable for the reease of a wide range of plastic resins, including polyurethane. In selecting the correct type of release, the plastic film 18 will still show sufficient adhesion to stick to the relase-plate 12 and protect it during transport but not resist separation from the surface once the block is on the job-site or "up" in the wall. Since the plates are inexpensive, they can be manufactured and used as a non-returnable item. The protruding part of the release-plaee and the plastic layers on top of it is relatively small and can, if desired, be no greater than the depth to which the mortar joints of the wall are to be raked. Thus the wall can be completely set up and finished with the plates 12 remaining thereon as a protective cover.

After the walls are otherwise complete, the plates 12 are removed. This reduces the possibilities of damage to the finish face 18, 19 and furthermore eliminates the necessity for cleaning the prefinished face from mortar-blotches and other foreign matter that otherwise would have been likely to contaminate the surface while the wall was being erected. Also, a finish which has been damaged in the wall can be easily repaired by preheating the face and manually pressing the release-plate onto it.

In some practices of the invention, it will be desired to have a depth dimension design on the finish face of the block. This can be produced by the use of a plate, which has an embossed design in the top of the plate. One such plate is illustrated in FIGS. 3 and 4. Here the plate 25 has a plurality of stripes, formed by ridges 26 and grooves 27, in relief in the top of the plate. This plate would be coated with a plastic material, as previously described, up to a level as indicated by line 28. The block would be slightly smaller than the plate as indicated by dotted line 30 representing the outline of the block 11. After the block was deposed onto the plate, the plastic cured and the plate removed from the block, its face would show a series of ridges thereon, corresponding to the position of the grooves 27. Innumerable other dimensional designs could be employed, limited only by the imagination. The dimensional designs also can be employed in connection with the colored plastic. For example, the first layer 18 of the colored plastic decorative material would be inserted only in the bottom of depressions 27 of plate 25, while the remaining liquid or sheet-plastic (up to fill line 28) would comprise a differently colored layer 19.

In the alternative embodiment of FIG. 5, a plate 32 of appropriate plastic is employed. This plate has been molded so that it has ridges 33 and grooves 34 on the top surface and corresponding grooves 35 and ridges on the bottom surface. The first decorative layer 18 only fills grooves 34. This is covered by the second decorative layer 19 and finally by the adhesive layer 20. A resilient blanket 37 is employed which has grooves 38 and ridges 39 which mate with ridges and grooves 36 and 35 respectively. This arrangement ensures that the relief design of the plate is faithfully reproduced on the face of the block when the adhesive and decorative layers are secured thereto and the plate removed.

In a further variation, the plate, such as 32, is not preformed, but is made of an easily deformable material. For example, the plate can be a paper having a thickness of 2 to 5 mils with a release coating thereon. As in FIG. 5, the blanket 37 has the grooves 38 and ridges 39 formed therein. When this plate (having the desired decorative coating thereon) is pressed between block 11 and the blanket 37, ridges and grooves corresponding to those in the blanket are impressed in the plate and end up as such on the face 10 of the block. For this purpose the blanket should have sufficient rigidity that the ridges thereon are not significantly deformed. A material having a Durometer hardness of about 80% and a minimum thickness of $\frac{1}{16}$ to $\frac{1}{32}$ of an inch is eminently satisfactory.

I claim:
1. A method of providing a finish coating on a porous face of a prepared article which is to be used as a construction block, tile, or the like, comprising the steps of:
   (a) separately and preliminarily preparing a finish coating by the sub-steps of:
      (1) providing a flat release plate with a surface area and perimeter larger than said porous face,
      (2) producing said finish coating by applying a first layer of plastic material on the release plate, applying a design of plastic material on the surface of the first layer, spraying the applied layer with a protective coating and completely curing said protective coating so as to prevent bleeding or interaction of the two layers of plastic material, and thereafter applying a layer of heat activatable adhesive to said cured protective coating where the adhesive dries to form a tack-free surface,
   (b) positioning the tack-free surface of the adhesive against the porous face of said prepared article,
   (c) positioning a resilient blanket against said plate with the finish coating on the plate being between the blanket and the article,
   (d) heating said adhesive to liquify it and pressing against the article and blanket to force the liquified adhesive into the porous face of said article with the resilient blanket forcing any overlapping edges of the plate and finish coating around the porous face of said article thereby bonding the finish coating to the porous face of said article,
   (e) and removing the resilient plate with said release plate providing a readily removable protective covering for the finish coating on the porous article.

2. A method as claimed in claim 1 in which the release plate is formed of one of the following materials: plastic, cardboard, and paper.

3. A method as claimed in claim 1 in which the mechanical application of the finish coating to the release plate is accomplished by extruding the finish coating onto the release plate.

4. A method as claimed in claim 1 in which the mechanical application of the finish coating to the release plate is accomplished by laminating the finish coating onto the release plate.

5. A method as claimed in claim 1 in which the mechanical application of the finish coating to the release plate is accomplished by roller-coating the finish coating onto the release plate.

6. A method as claimed in claim 1 in which the mechanical application of the finish coating to the release plate is accomplished by printing the finish coating on the release plate.

7. A method as claimed in claim 1 in which the heat and pressure of a hot press is utilized to liquify the heat-reactive adhesive and cause it to enter the pores of the porous face of the article.

8. A method as claimed in claim 1 in which the article has retained heat of manufacture, and in which said retained heat of manufacture is utilized to provide the liquifying heat for the heat-reactive adhesive.

9. A method as claimed in claim 1 in which the finish coating is applied in at least two layers, one of which is a layer of decorative material having a surface to which adhesive will bond and another of which is an outer layer of the heat-reactive adhesive.

10. A method as claimed in claim 9 in which the adhesive is a type which will be reactivated by a temperature below the deforming point of the layer of decorating material.

References Cited
UNITED STATES PATENTS

| | | | |
|---|---|---|---|
| 2,817,619 | 12/1957 | Bickel et al. | 156—239 X |
| 2,850,890 | 9/1958 | Rubenstein | 52 Rub. digest |
| 2,205,423 | 6/1940 | Lefebvre | 52—173 |
| 2,837,457 | 6/1958 | Baxter | 52—173 |
| 2,751,775 | 6/1956 | Sergovic | 52—309 |
| 3,532,574 | 10/1970 | Davis | 156—239 X |
| 2,956,703 | 10/1960 | Royal | 156—71 |
| 1,966,942 | 7/1934 | Atkinson | 156—230 |
| 3,150,032 | 9/1964 | Rubenstein | 52—Dig 7 |
| 3,393,106 | 7/1968 | Marrinan | 156—232 |
| 3,558,418 | 1/1971 | Porter, Jr. et al. | 156—71 |
| 3,027,290 | 3/1962 | Valore, Jr. | 156—245 |
| 3,441,457 | 4/1969 | Regnaud | 156—71 |
| 2,951,001 | 8/1960 | Rubenstein | 156—245 |
| 3,580,777 | 5/1971 | Hartzell et al. | 156—71 |

CARL D. QUARFORTH, Primary Examiner

R. S. GAITHER, Assistant Examiner

U.S. Cl. X.R.

52—309, 515; 156—71, 230, 239, 247, 321